(12) United States Patent
Mueller et al.

(10) Patent No.: US 12,206,777 B2
(45) Date of Patent: Jan. 21, 2025

(54) MECHANISMS AND APPARATUS FOR SECURING BROADCAST CONTENT DISTRIBUTION OF TIME-SENSITIVE DATA

(71) Applicant: AT&T Intellectual Property I, L.P., Atlanta, GA (US)

(72) Inventors: Julius Mueller, East Palo Alto, CA (US); Paul T. Crews, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 110 days.

(21) Appl. No.: 17/865,442

(22) Filed: Jul. 15, 2022

(65) Prior Publication Data

US 2022/0353072 A1     Nov. 3, 2022

Related U.S. Application Data

(63) Continuation of application No. 16/285,273, filed on Feb. 26, 2019, now Pat. No. 11,424,923.

(51) Int. Cl.
*H04L 9/40* (2022.01)
*G06F 16/9537* (2019.01)
(Continued)

(52) U.S. Cl.
CPC ........ *H04L 9/0872* (2013.01); *G06F 16/9537* (2019.01); *H04L 9/08* (2013.01); *H04L 9/0819* (2013.01); *H04L 9/088* (2013.01); *H04L 63/0428* (2013.01); *H04L 63/0876* (2013.01); *H04W 12/033* (2021.01); *H04W 12/041* (2021.01); *H04W 12/06* (2013.01); *H04L 2209/601* (2013.01); *H04L 2209/80* (2013.01); *H04N 21/25816* (2013.01); *H04N 21/4821* (2013.01); *H04N 21/63345* (2013.01)

(58) Field of Classification Search
CPC ............ H04L 63/0428; H04L 63/0876; H04L 63/068; H04L 9/08; H04L 9/0819; H04L 9/0872; H04L 9/088; H04L 2209/601; H04L 2209/80; G06F 16/9537; H04W 12/041; H04W 12/033; H04W 12/06; H04W 12/60; H04W 12/61; H04W 12/63; H04W 12/64; H04N 21/25816; H04N 21/4821; H04N 21/25841; H04N 21/41407; H04N 21/4385; H04N 21/43853; H04N 21/43856; H04N 21/4405; H04N 21/44055; H04N 21/4524; H04N 21/6131; H04N 21/6181; H04N 21/6334; H04N 21/63345
See application file for complete search history.

(56) References Cited

U.S. PATENT DOCUMENTS 7,444,137 B1    10/2008  Mcnamara et al.
9,330,275 B1 *   5/2016  Endresen ............ G06F 21/6218
(Continued)

*Primary Examiner* — Jeremy S Duffield
(74) *Attorney, Agent, or Firm* — Guntin & Gust, PLC; Mark Wilinski

(57) ABSTRACT

Aspects of the subject disclosure may include, for example, authenticating a user device based on communication over a data plane of a network, generating a decryption key, transmitting the decryption key to the user device, and transmitting encrypted content to the user device. The encrypted content may be accessible at the user device via the encryption key, potentially as a function of location and/or time. Other embodiments are disclosed.

18 Claims, 10 Drawing Sheets

(51) Int. Cl.
*H04L 9/08* (2006.01)
*H04N 21/258* (2011.01)
*H04N 21/482* (2011.01)
*H04N 21/6334* (2011.01)
*H04W 12/033* (2021.01)
*H04W 12/041* (2021.01)
*H04W 12/06* (2021.01)

(56) References Cited

U.S. PATENT DOCUMENTS

| | | | |
|---|---|---|---|
| 9,344,427 B1* | 5/2016 | Mehta | H04L 63/0884 |
| 9,510,173 B2 | 11/2016 | Cai et al. | |
| 9,602,677 B2 | 3/2017 | Sharma et al. | |
| 9,838,145 B2 | 12/2017 | Tawfiq Moshtaha et al. | |
| 9,860,790 B2 | 1/2018 | Khan et al. | |
| 10,021,533 B2 | 7/2018 | Chandramouli et al. | |
| 2005/0235361 A1 | 10/2005 | Alkove et al. | |
| 2008/0250021 A1* | 10/2008 | Boys | G06F 16/5838 |
| | | | 707/999.009 |
| 2009/0316900 A1 | 12/2009 | Qiu et al. | |
| 2010/0287585 A1* | 11/2010 | Frondal | H04N 7/17318 |
| | | | 725/31 |
| 2011/0070861 A1 | 3/2011 | Musgrove et al. | |
| 2014/0162685 A1 | 6/2014 | Edge | |
| 2014/0310375 A1* | 10/2014 | Jeon | H04L 67/63 |
| | | | 709/217 |
| 2014/0337927 A1* | 11/2014 | Medvinsky | H04N 21/4147 |
| | | | 726/4 |
| 2015/0244532 A1 | 8/2015 | Bi et al. | |
| 2016/0072823 A1* | 3/2016 | Faccin | H04W 12/08 |
| | | | 726/1 |
| 2017/0064078 A1* | 3/2017 | Dahan | H04L 67/61 |
| 2017/0242420 A1* | 8/2017 | Mugnier | G08C 17/02 |
| 2017/0270528 A1* | 9/2017 | Prakash | G06Q 20/3224 |
| 2017/0279733 A1* | 9/2017 | Marshall | H04L 47/70 |
| 2018/0097622 A1* | 4/2018 | Kurokawa | H04W 4/60 |
| 2018/0176644 A1* | 6/2018 | Lopez | H04N 21/42203 |
| 2018/0352416 A1 | 12/2018 | Ryu et al. | |
| 2019/0028278 A1 | 1/2019 | Gilson | |
| 2020/0067904 A1* | 2/2020 | Hugot | G06F 21/31 |
| 2020/0205221 A1* | 6/2020 | Li | H04W 76/12 |
| 2020/0249326 A1 | 8/2020 | Bhaskaran et al. | |
| 2020/0274854 A1 | 8/2020 | Mueller et al. | |
| 2020/0344576 A1 | 10/2020 | Li et al. | |
| 2021/0044967 A1 | 2/2021 | Stein et al. | |

* cited by examiner

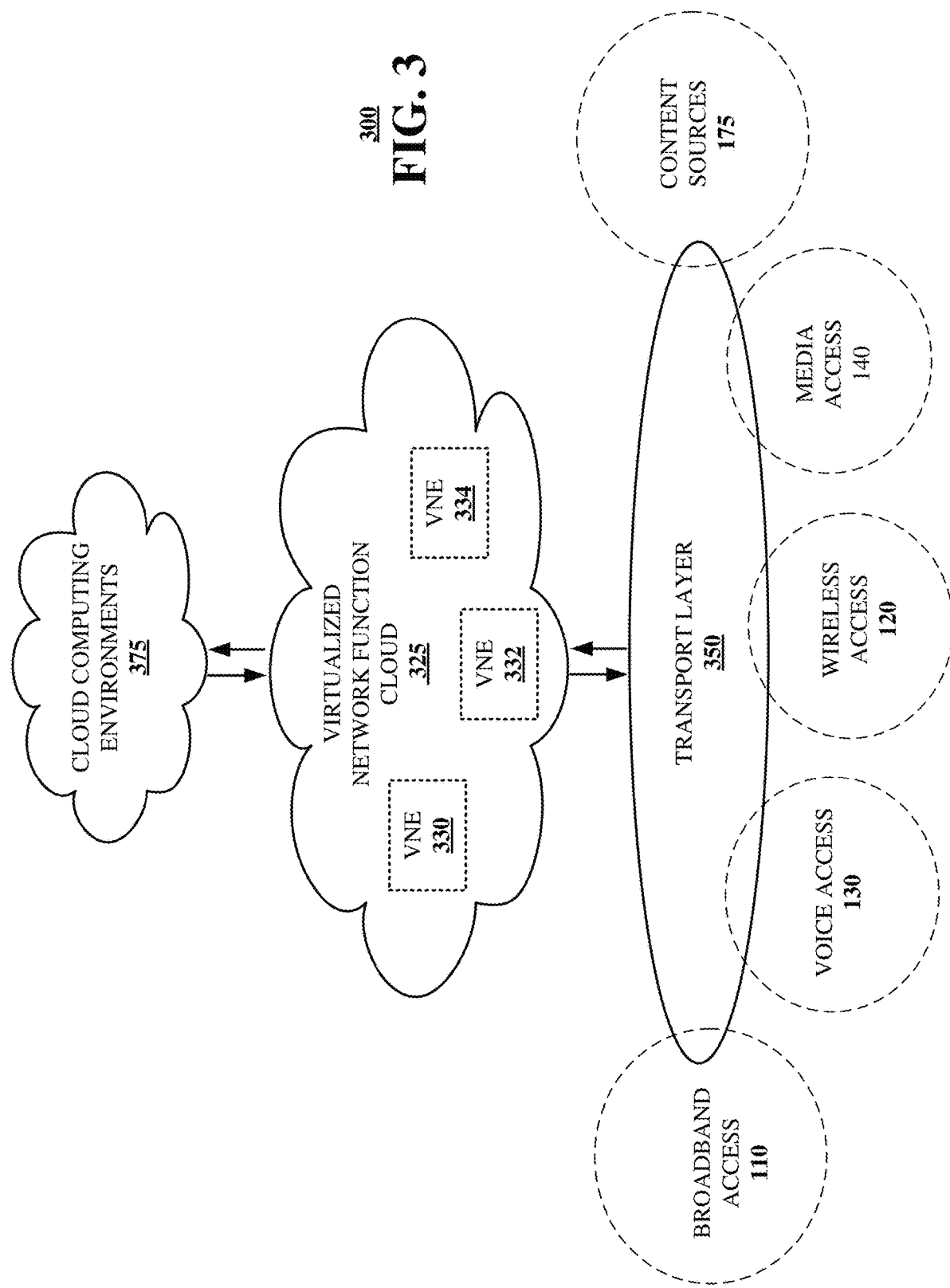

600

US 12,206,777 B2

MECHANISMS AND APPARATUS FOR SECURING BROADCAST CONTENT DISTRIBUTION OF TIME-SENSITIVE DATA

CROSS-REFERENCE TO RELATED APPLICATIONS

This application is a continuation of U.S. patent application Ser. No. 16/285,273, filed Feb. 26, 2019. All sections of the aforementioned application are incorporated herein by reference in their entirety.

FIELD OF THE DISCLOSURE

The subject disclosure relates to mechanisms and apparatuses for securing broadcast content distribution of time-sensitive data.

BACKGROUND

In order to monetize the efficient and scalable delivery and distribution of content (e.g., media) across networks, network operators and service providers must be able to provide the content in a secure manner to ensure that only authorized users/devices can access the content. For example, in the absence of an agreement (e.g., a license), such authorized users that access the content must be prohibited from redistributing the content in turn. Existing technologies for distributing/disseminating content fails to strike an adequate balance between cost, efficiency, scalability, and security.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for providing content to one or more users and/or one or more devices in accordance with a credential. Other embodiments are described in the subject disclosure.

One or more aspects of the subject disclosure include authenticating a first user device, determining a location of the first user device, transmitting a credential to the first user device, and transmitting content to the first user device. The credential may be based on the location of the first user device. The content may be accessible at the first user device via the credential. The content may be inaccessible at a second user device that is different from the first user device. The content may be inaccessible at the first user device following an expiration of a timeout relative to when the content is transmitted to the first user device and/or relative to when the content is received by the first user device. The content may be inaccessible at the first user device following a change of location as geographical area.

One or more aspects of the subject disclosure include authenticating a user device in order to provide the user device with access to content distributed over a network. In some embodiments, the content may be distributed in accordance with broadcast or unicast technology. In some embodiments, the content may be distributed over a control plane of a network. In some embodiments, the user device may be authenticated via a data plane of a network.

One or more aspects of the subject disclosure include authenticating a user device. In some embodiments, the authentication of the user device may include matching a subscriber identification associated with the user device to a registered internet protocol (IP) address and the referring tracking area of the user device.

Figure 1:
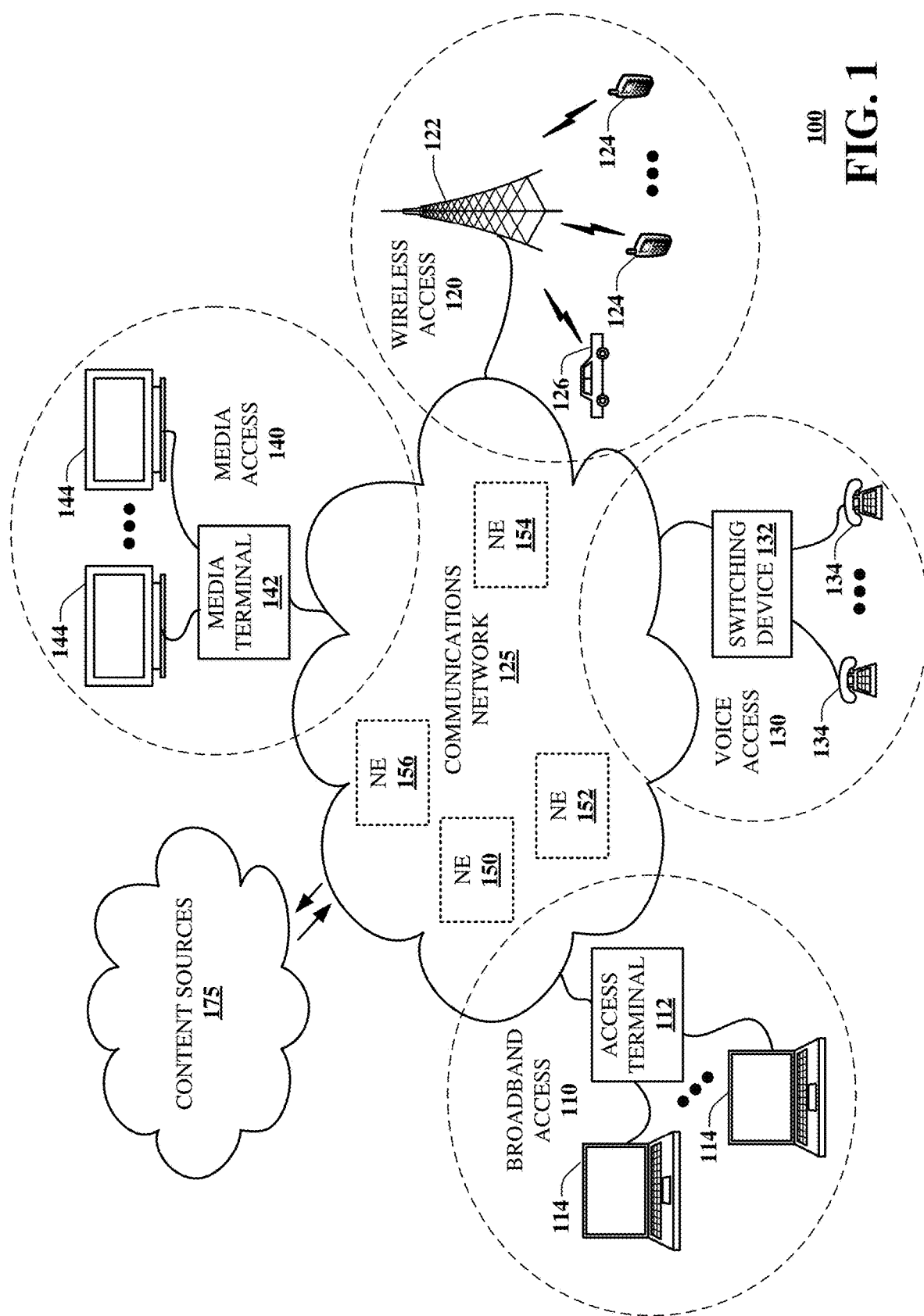
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part operations that include authenticating a user device, determining a location of the user device, transmitting a credential to the user device, and transmitting content (e.g., media, correction data or mapping data) to the user device. In some embodiments, the authenticating occurs over a data plane of the network 100. In some embodiments, the determining of the location of the user device occurs responsive to the authenticating of the user device. In some embodiments, the credential is based on the location of the user device. In some embodiments, the content is accessible at the user device based on the credential. In some embodiments, the content is transmitted to the user device over a control plane of the network 100. In some embodiments, the content is transmitted to the user device using broadcast technology. In some embodiments, the content is inaccessible to the user device following an expiration of a timeout. The timeout may be measured relative to when the content is transmitted to the user device and/or when the content is received by the user device.

As shown in FIG. 1, a communications network 125 is presented for providing broadband access 110 to a plurality of data terminals 114 via access terminal 112, wireless access 120 to a plurality of mobile devices 124 and vehicle 126 via base station, road site units (RSUs) or access point 122, voice access 130 to a plurality of telephony devices 134, after market devices for vehicles, via switching device 132 and/or media access 140 to a plurality of audio/video display devices 144 via media terminal 142. In addition, communication network 125 is coupled to one or more content sources 175 of audio, video, graphics, text and/or other media, GNSS correction data and mapping data. While broadband access 110, wireless access 120, voice access 130 and media access 140 are shown separately, one or more of these forms of access can be combined to provide multiple access services to a single client device (e.g., mobile devices 124 can receive (media) content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, the Cell Broadcast technology with SIB12 messages, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

As described above, network operators and service providers may require an ability to distribute/disseminate content (e.g., media) in a secure manner. Generally speaking, secure content distribution may be categorized/characterized in accordance with at least five parameters: (1) real-time streaming versus static content distribution, (2) unicast, multicast, or broadcast distribution, (3) wireless (e.g., cellular) versus fixed transport, (4) availability of massive broadband network resources versus resource-constrained network topologies, and (5) short-living/time-sensitive data versus permanent data.

A particular content distribution platform/architecture may adhere to any number of the aforementioned parameters, or one or more portions of a given parameter. For example, in terms of a soccer game that may be accessible as a pay-per-view (PPV) event, footage (e.g., video and/or audio) of the soccer game may be available to users and/or user devices via linear-pay-television (LPT) using: (1) real-time streaming, (2) broadcast distribution resources, (3) wireless communications, and (4) broadband network resources, where (5) the footage may expire after a predetermined time period. Other examples include the distribution of GNSS correction and (high-definition) mapping data. One skilled in the art will appreciate, based on a review of this disclosure, that other examples may be constructed using the parameters set forth above. Still further, one skilled in the art will appreciate based on a review of this disclosure that the devices shown in FIG. 1 are illustrative, and other types of devices (e.g., drones, augmented reality/virtual reality (AR/VR) headsets, etc.) may be used in some embodiments.

Figure 2A:
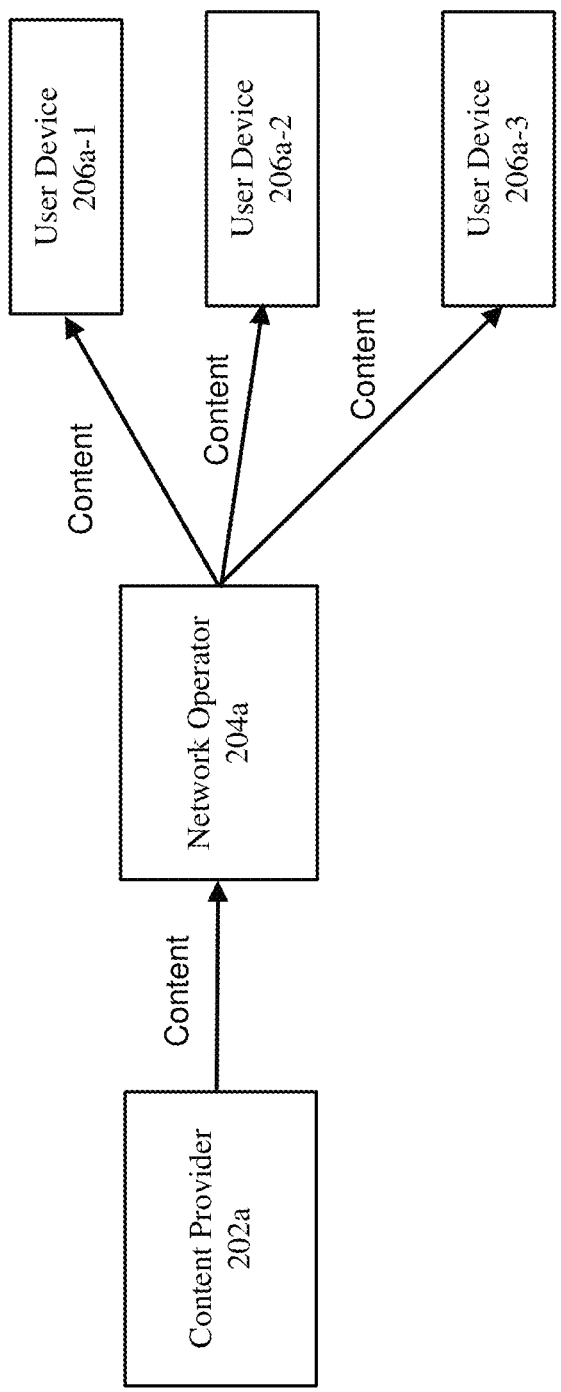
FIG. 2A is a block diagram illustrating an example, non-limiting embodiment of a system functioning within the communication network of FIG. 1 and distributing unencrypted content in accordance with various aspects described herein.

Referring now to FIG. 2A, a system 200a is shown. The system 200a may function within the communication network 100 of FIG. 1. The system 200a may be used to distribute content. For example, a content provider 202a may provide content to a network operator 204a. The network operator 204a may, in turn, provide the content (as potentially modified or altered by the network operator 204a) to user devices 206a-1, 206a-2, and 206a-3. The network operator 204a may provide (e.g., transmit) the content in accordance with a broadcast distribution model. In this respect, the network operator 204a may transmit the content in an unsecure/unencrypted manner. Distribution via the system 200a may be suitable for various types of content, such as for example public service announcements (e.g., weather-related warnings or alerts, emergency information, etc.).

The network operator 204a may include a service operator, a network service operator, or a combination thereof. A service operator may receive data (e.g., content) and process the data. A network service operator may receive and distribute data through a network.

Figure 2B:
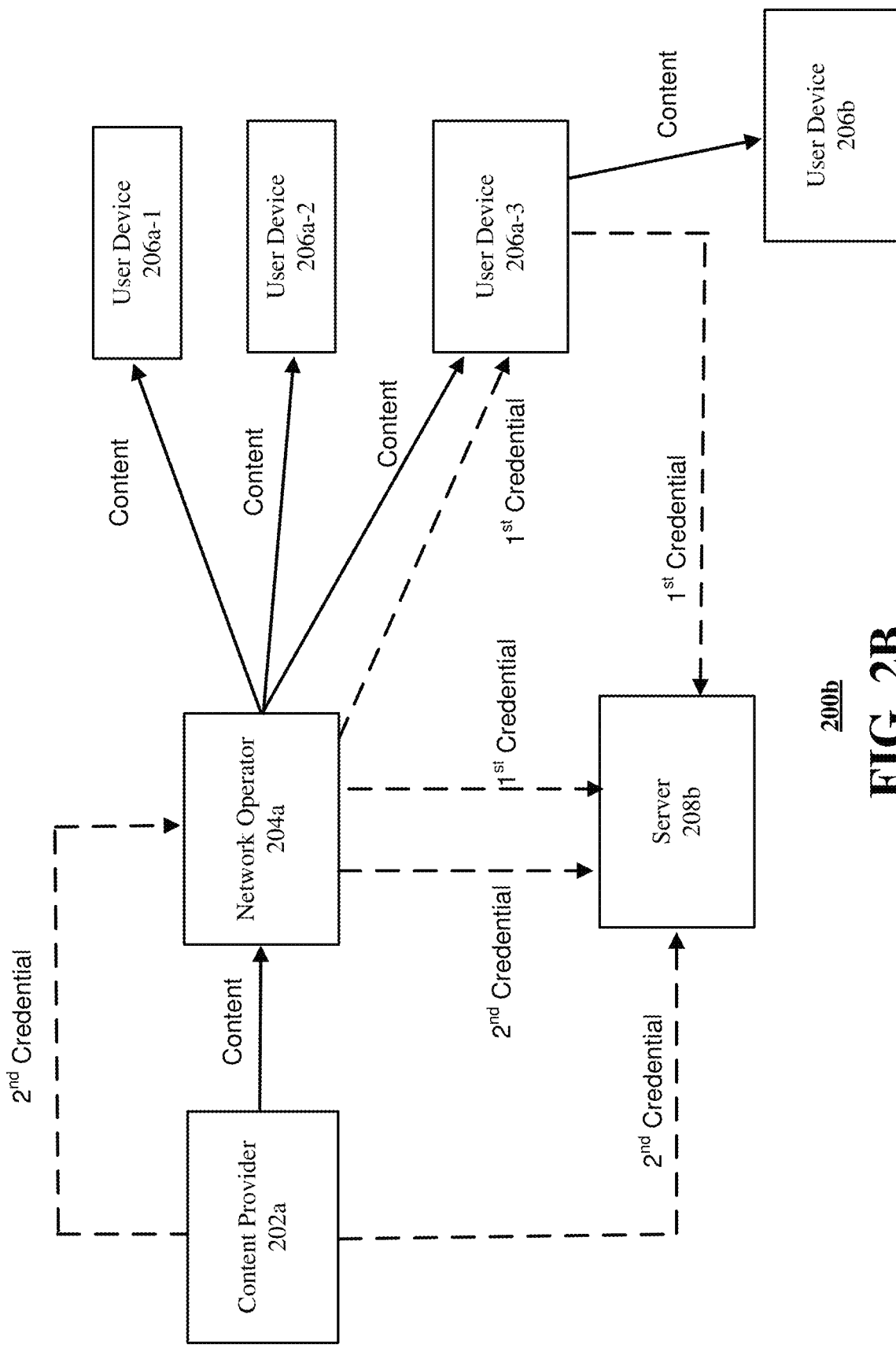
FIG. 2B-2C are block diagrams illustrating example, non-limiting embodiments of systems functioning within the communication network of FIG. 1 and distributing encrypted content in accordance with various aspects described herein.

To enhance the security of the content distributed via a network, a credential-based approach may be used. For example, FIG. 2B illustrates a system 200b. Much like the system 200a of FIG. 2A, the system 200b may include the content provider 202a, the network operator 204a, and user devices 206a-1 through 206a-3. Unlike the system 200a, the content distributed in the system 200b may be secured via one or more credentials. For example, the content distributed in the system 200b may have encryption applied thereto. The user devices 206a-1 through 206a-3 may need to be authenticated by, e.g., a server 208b in order to obtain access to the content (e.g., in order to decrypt the content).

As part of an authentication of a user device (e.g., the user device 206a-3), one or more credentials may be used. For example, the network operator 204a and the user device 206a-3 may share with one another a first credential. When the user device 206a-3 attempts to access the content received from the network operator 204a, the user device 206a-3 may transmit the first credential (or an indication of the first credential) to the server 208b. The network operator 204a may also provide (e.g., transmit) the first credential to the server 208b. If the (instance of the) first credential provided by the user device 206a-3 to the server 208b matches the (instance of the) first credential provided by the network operator 204a to the server 208b, the server 208b may determine that the user device 206a-3 is authorized to access the content; e.g., the server 208b may determine that the user device 206a-3 has a valid account/subscription with the network operator 204a.

As a further measure of security, each of the user devices 206a-1 through 206a-3 may have assigned to it their own unique first credential with respect to the network operator 204a. Proceeding in such a manner would preclude a first user device (e.g., user device 206a-3) from sharing the first credential with another user device (e.g., user device 206a-2), and would help to protect potential investments made by the network operator 204a.

As yet another measure of security, the content provider 202a and the network operator 204a may share with one another a second credential. The content provider 202a and the network operator 204a may provide (respective instances of) the second credential to the server 208b. The server 208b may compare the (instance of the) second credential that it receives from the network operator 204a with the (instance of the) second credential received from the content provider 202a. If there is a match based on the comparison, the server 208b may be reasonably confident that the network operator 204a is authorized to distribute the content received from the content provider 202a. Conversely, the lack of such a match may be indicative of an attempt on the part of the network operator 204a to distribute the content in an unauthorized manner.

In view of the foregoing, the server 208b may grant access to content requested by a user device upon the validation of one or more credentials (e.g., validation of both the first credential provided by the user device 206a-3 to the server 208b and validation of the second credential provided by the network operator 204a to the server 208b). A level of sensitivity associated with the content may dictate the extent of the credential-validation scheme/technique that is used by, e.g., the server 208b in a given embodiment. The credentials used in the system 200b may take one or more forms. For example, the credentials may include, or be based on, one or more of a username and password, a personal identification number (PIN), fingerprint or retinal scans, image recognition techniques, biometric sampling, one or more keys (e.g., potentially in accordance with a public-private key infrastructure), etc.

While the security provided to the content described above in respect of the system 200b represents an enhancement relative to the system 200a, that security ceases at the user devices. For example, and assuming that the network operator 204a is authorized to distribute the content (in accordance with the second credential) and assuming that the user device 206a-3 is an authorized subscriber of (e.g., has a valid account with) the network operator 204a (in accordance with the first credential), when the user device 206a-3 obtains a decrypted version of the content (frequently referred to as plaintext in the art) the user device 206a-3 can potentially redistribute the content in turn. For example, as shown in FIG. 2B, the user device 206a-3 may provide/transmit the (unencrypted version of the) content to a user device 206b. The user device 206b might not be an authorized customer/subscriber of the network operator 204a (or any network operator, for that matter), such that the user device 206b may effectively access the content in an unauthorized manner.

In order to preclude the scenario described above where the user device 206a-3 redistributes the content to an unauthorized user device 206b, traditional techniques would tend to focus on enhancing the security associated with the distribution of the content by incorporating aspects of a unicast distribution model. While effective, unicast fails to scale as the number of users/user devices serviced within a network increases. Stated slightly differently, as the number of users/user devices within a network increases, the amount of overhead (e.g., the amount of network traffic, the amount of computing resources used, etc.) associated the distribution of content in accordance with a unicast distribution model also increases. For networks with large numbers of users/user devices, the use of a unicast distribution model becomes unwieldy/infeasible. In this respect, it is noted that the systems 200a and 200b are shown with a mere handful number of user devices for the sake of simplicity in illustration; in many practical embodiments, the number of user devices serviced by a network operator will be significantly larger.

Figure 2C:
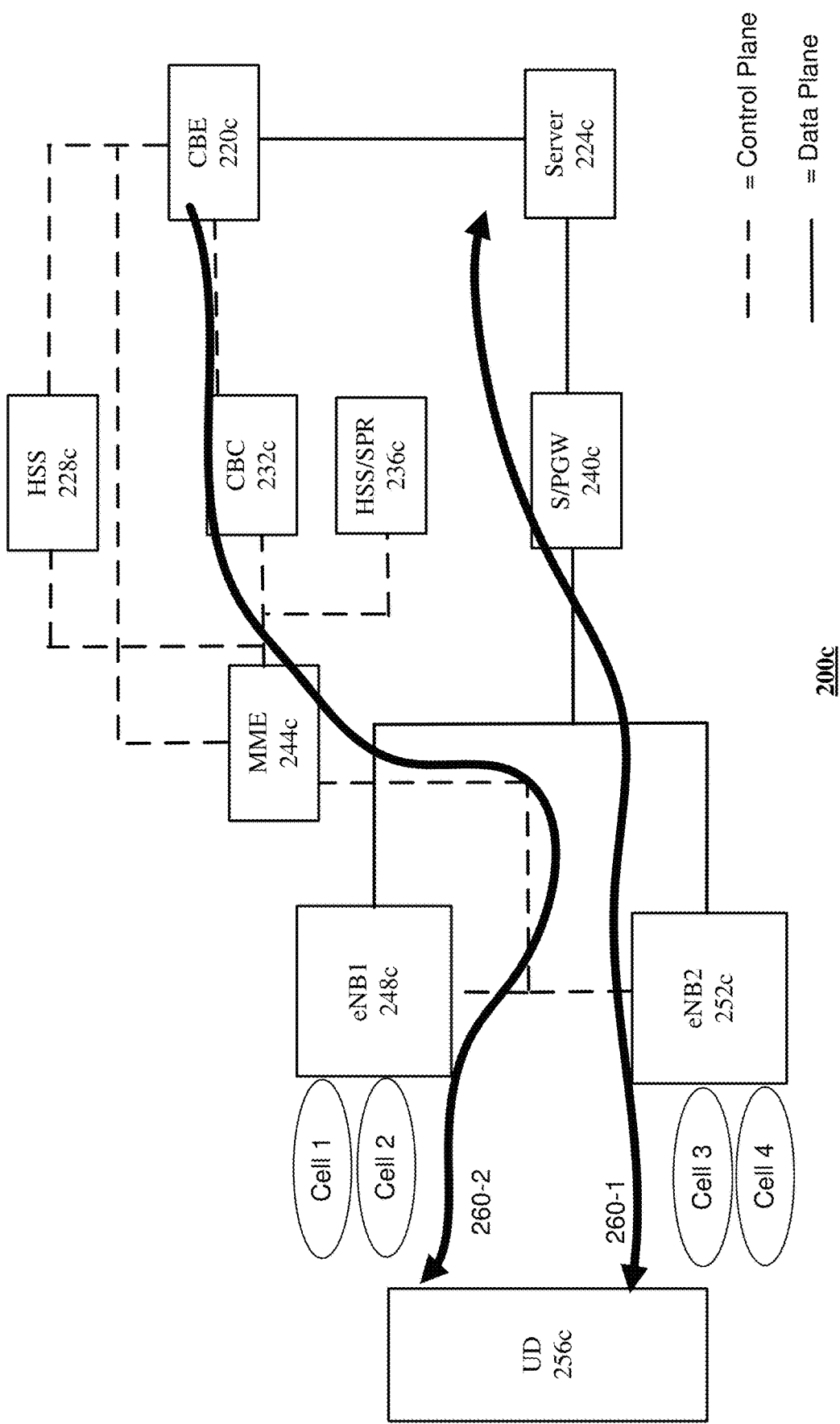

Aspects of this disclosure may address potential security flaws described above in connection with the systems 200a and 200b, while also reducing (e.g., minimizing) an amount of overhead that is used in the distribution of content. For example, aspects of this disclosure may leverage broadcast distribution techniques to reduce overhead while simultaneously providing for secure distribution of content that scales with the number of users/user devices that are supported. To demonstrate, FIG. 2C shows a system 200c that may incorporate one or more aspects of the network 100, the system 200a, and/or the system 200b. The system 200c may include a number of entities that are described in further detail below.

The system 200c may include a cell broadcast entity (CBE) 220c. The CBE 220c may store content that is to be distributed/disseminated as part of the system 200c. For example, the CBE 220c may receive content provided by content providers (see, e.g., content provider 202a in FIGS. 2A-2B). The CBE 220c may be coupled (e.g., communicatively coupled) to a server 224c as described further below. The server 224c may incorporate aspects of authentication similar to the server 208b described above in connection with the system 200b.

The CBE 220c may distribute/transmit the content to a cell broadcast center (CBC) 232c. The CBC 232c may be coupled with a home subscriber server (HSS) 228c and/or a HSS/subscriber profile repository (SPR) 236c. Taken individually or collectively, the HSS 228c and/or the HSS/SPR 236c may be responsible for maintaining user/subscriber information and policies (e.g., user identifiers, addresses, profile information, quality of service (QoS) parameters, etc.).

A mobility management entity (MME) 244c may initiate paging and authentication of user devices, such as for example a user device (UD) 256c as shown as part of the system 200c. The MME 244c may oversee aspects of user/user device mobility. The MME 244c may facilitate setting up or tearing down communication sessions.

One or more base stations or evolved Node Bs (eNBs) may potentially communicate with the UD 256c (which may correspond to one or more of the user devices 206a-1 through 206a-4 of FIGS. 2A-2B), such as for example a first eNB (eNB1) 248*c* and/or a second eNB (eNB2) 252*c*. The eNBs 248*c* and 252*c* may provide service/communications in respect of one or more cells managed by the respective eNB. For example, a first set of two cells (denoted as Cell 1 and Cell 2) may be managed by the eNB1 248*c* and a second set of two cells (denoted as Cell 3 and Cell 4) may be managed by the eNB2 252*c*. An eNB may manage, or provide coverage for, more or less than two cells in a given embodiment. A first of the cells (e.g., Cell 1) may be distinguished from another of the cells (e.g., Cell 2) on the basis of one or more operating parameters. For example, Cell 1 and Cell 2 may be distinguished from one another based on a band or range of frequencies used/supported by the respective cell.

The system 200*c* may include a serving gateway/packet gateway (S/PGW) 240*c*. The S/PGW 240*c* may help to facilitate communication/data sessions for a particular UD (e.g., UD 256*c*), provide access to external networks (e.g., packet data networks), dictate parameters (e.g., QoS and/or bandwidth parameters) for a given session, and/or provide routing functions/capabilities (potentially in connection with one or more protocols or standards).

The entities shown and described above in connection with the system 200*c* of FIG. 2C may be coupled to one another via one or more interfaces/planes. For example, in FIG. 2C various entities are shown as being connected/coupled to one another via dashed lines that are indicative of a control/signaling plane in conventional network architectures. Similarly, in FIG. 2C various entities are shown as being connected/coupled to one another via solid lines that are indicative of a data plane in conventional network architectures. Overlaid on the system 200*c* are boldface arrows 260-1 and 260-2. The arrows 260-1 and 260-2 are representative of operations to authenticate the UD 256*c* and provide content to the UD 256*c*, respectively, as described further below.

Assuming that the UD 256*c* requests access to content provided by, e.g., the CBE 220*c*, the UD 256*c* may undergo an authentication procedure in order to validate that the UD 256*c* is authorized to access the content. For example, the UD 256*c* may engage in a bi-directional communication (e.g., a handshake communication) with the server 224*c* (by way of, e.g., the eNB2 252*c* and the S/PGW 240*c*) as represented by the arrow 260-1. The communication between the UD 256*c* and the server 224*c* may incorporate one or more of the credentials described above in connection with the system 200*b* of FIG. 2B. The communication used for authentication purposes may occur over the data plane as shown in FIG. 2C.

Assuming that the UD 256*c* is authorized to access the requested content, the server 224*c* may provide an indication of the authorization/authentication to, e.g., the CBE 220*c* (or another entity, such as for example the CBC 232*c*). In response to receiving that indication of the authentication, the CBE 220*c* (or the another entity, as appropriate) may cause the content to be provided to the UD 256*c* (by way of, e.g., the CBC 232*c*, the MME 244*c*, and the eNB1 248*c*) as represented by the arrow 260-2. The communication used for transferring/transmitting the content to the UD 256*c* may occur over the control plane as shown in FIG. 2C.

In the example shown in FIG. 2C, the authentication of the UD 256*c* may occur via the eNB2 252*c*, whereas the content may be provided/delivered to the UD 256*c* via the eNB1 248*c*. The use of different eNBs for authentication and content delivery may be based on a tracking of a mobility of the UD 256*c*. For example, a handover procedure may be initiated based on, e.g., the MME 244*c* monitoring movements of the UD 256*c* and selecting an eNB for executing a particular function as appropriate. Still further, a particular resource/entity may be used or selected based on one or more parameters, such as for example a capability of a given entity, load (e.g., network traffic conditions), identification of a particular content item requested by the UD 256*c*, a type of communication session (e.g., voice, video, data, etc.) requested by the UD 256*c*, etc.

As illustrated in FIG. 2C, the arrow 260-2 is shown with a single arrowhead (proximate the UD 256*c*) which represents a unidirectional communication path in transferring the content. This transfer may be representative of the use of a broadcast model, where the content is delivered from a content source (in this example, the CBE 220*c*) to a destination (in this example, the UD 256*c*) without specific regard as to whether a particular device (in this example, the UD 256*c*) requested the content or received the content. The unidirectional communication associated with the arrow 260-2 greatly simplifies overhead/resource utilization along the path represented by the arrow 260-2 and readily scales with the number of users/user devices that are supported. The unidirectional communication over the control plane also enhances security of user data by reducing (e.g., minimizing) network exposure to that user data.

In contrast to the arrow 260-2, the arrow 260-1 is shown in FIG. 2C as a dual-headed arrow. Aspects of receiving a request for content and determining whether a user/user device is authorized to access the content are handled by the communication path represented by the arrow 260-1. Additionally, the communication path represented by the arrow 260-1 may be used to provide accounting services/functionality (e.g., billing) for use of the network or providing access to requested content. Use of the data plane to provide for such authorization and/or accounting is efficient due to the handshake nature of the communications involved in the authentication.

Thus, in accordance with the above, existing control plane and data plane resources may be used to facilitate the transmission and reception of content, as well as authentication and accounting. The use of the system 200*c* as described above represents a cost-effective implementation that requires little, if any, additional allocation of resources relative to existing/legacy networks. Aspects of this disclosure as described above are scalable in the sense that the transmission of the content (largely adhering to principles of broadcast technology) can provide the content to both small and large pools of users/user devices; this may be contrasted with unicast technology, which becomes very costly to implement on the basis of a large pool of users/user devices due to the overhead/complexity involved. Still further, aspects of the operation of the system 200*c* set forth above respect user data and enhance privacy by potentially only exposing user data to the extent necessary to authenticate the user (or associated user device).

In terms of authentication, collected data regarding a location of the UD 256 may be mapped to one or more credentials (e.g., keys) provided/managed by the server 224*c*. In some embodiments, when the location of the UD 256 changes in an amount that is greater than a threshold (potentially as a function of time), the credentials could be rendered inoperative. Rendering a credential inoperative may be used to prohibit dissemination of the content by an authorized user/user device to additional, unauthorized users/devices. Still further, locations of the UD 256 may be monitored over time to determine whether at a particular point in time the (current) location of the UD 256 appears suspicious; if so, the credentials may be at least temporarily revoked until the user/user device is authenticated once again (potentially via an out of band communication channel in order to enhance reliability/security). Another aspect of security may entail checking/comparing a subscriber/user device identifier relative to an address (e.g., an IP address, a MAC address, etc.) of a user device stored in, e.g., the HSS 228c; the lack of a match may be indicative of an unauthorized user/user device attempting to access the content.

In some embodiments, data associated with the content may have a timeout feature associated with it, such that the data becomes unusable after the expiration of the timeout. In some embodiments, the timeout/expiration may be measured relative to when the data is transmitted to the user device, when the data is received by the user device (which may be based on a transmission of one or more acknowledgments by the user device upon receipt of, or access to, the content by the user device), or a combination thereof. In some embodiments, the timeout/expiration may be set/established within a range of 20 seconds to 5 minutes; other values may be used in some embodiments. This aspect of the timeout/expiration of the data may serve as another safeguard against a(n unauthorized) redistribution/re-dissemination of the content by a(n authorized) user/user device.

Figure 2D:
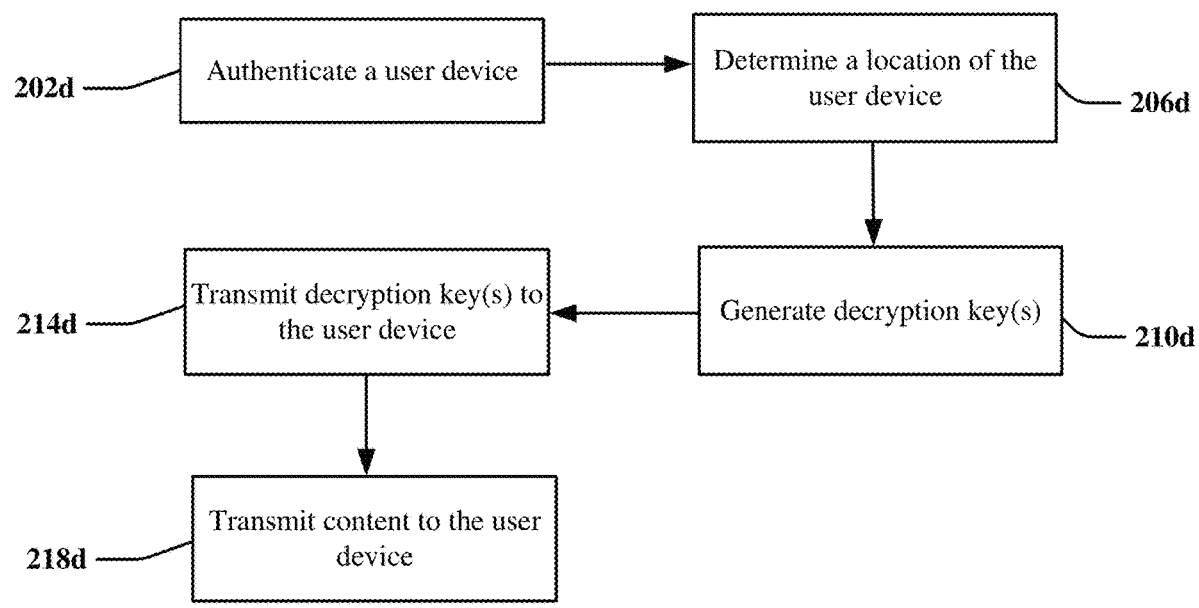
FIGS. 2D-2E depict illustrative embodiments of methods in accordance with various aspects described herein.

FIG. 2D depicts an illustrative embodiment of a method 200d in accordance with various aspects described herein. The method 200d may be at least partially executed by one or more systems, devices, or components, such as for example the systems, devices and components described herein. The method 200d may be operative in conjunction with one or more networks or systems, such as for example the network 100, the system 200a, the system 200b, and/or the system 200c described above.

In block 202d, a user device may be authenticated. For example, the authentication of block 202d may occur in response to a request to register the user device with a network/network operator. The authentication of block 202d may be performed responsive to a receipt of a request from the user device for content served/provided by the network/network operator.

The authentication of block 202d may be based on the user device supplying one or more credentials that match counterpart credential(s) associated with a content provider or a network operator/service provider. In some embodiments, the authentication of block 202d may be based on an identifier associated with the user device matching a listed of authorized user devices.

In block 206d, a location of the user device may be determined. For example, a location of a network element/entity in communication with the user device may be used as a proxy for the location of the user device. In some embodiments, the location of the user device may be determined based on the use of triangulation techniques, global positioning system (GPS) technology, etc.

In block 210d, one or more decryption keys may be generated. The decryption key(s) generated in block 210d may be based on the location of the user device determined in block 206d.

The decryption key(s) generated in block 210d may have a geographic limit/restriction associated with it/them, such that content requested by, or provided to, the user device may be accessible at the user device via the decryption key(s) only within a threshold distance of the location determined in block 206d. In some embodiments, the decryption key(s) generated in block 210d may have a timeout/expiration associated therewith as described above.

In some embodiments, the decryption key(s) generated in block 208d may be specific to a particular content item (or set of content items), which is to say that block 210d may be executed once for each content item (or set of content items).

In block 214d, the decryption key(s) generated in block 210d may be transmitted to the user device for receipt by the user device.

In block 218d, content (e.g., encrypted content) may be transmitted to the user device for receipt by the user device. The user device may be able to access (e.g., playback) the content via the decryption key(s) transmitted in block 214d, subject to any constraints/restrictions imposed by the decryption key(s) as described above. For example, the user device may be able to decrypt the (encrypted) content via the decryption key(s) the user device receives in conjunction with block 214d.

Figure 2E:
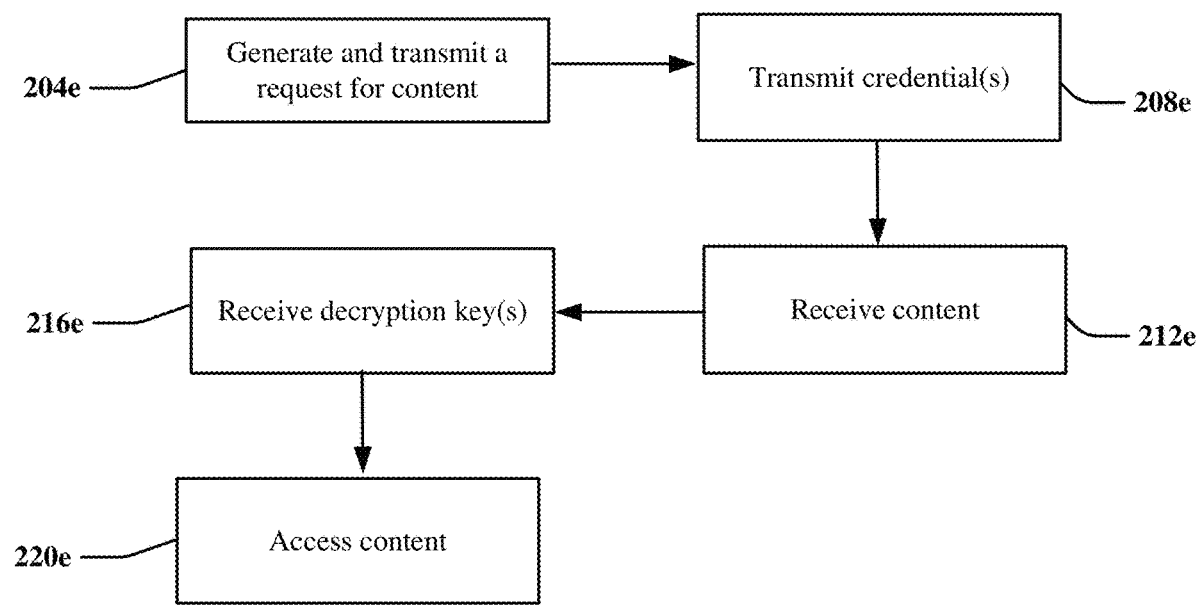

FIG. 2E depicts an illustrative embodiment of a method 200e in accordance with various aspects described herein. The method 200e may be at least partially executed by one or more systems, devices, or components, such as for example the systems, devices and components described herein. The method 200e may be operative in conjunction with one or more networks, such as for example the network 100, the system 200a, the system 200b, and/or the system 200c described above.

In block 204e, a request for content may be generated and transmitted. The request for content may be generated based on a selection of a content item from a listing of available content items. For example, a content item may be selected from an electronic programming guide (EPG), an interactive programming guide (IPG), from search results generated in response to an entered/submitted search query, etc. To the extent that a particular content item is requested, the transmission of the request in block 204e may include or specify an indication/identification of the content item.

In block 208e, one or more credentials may be transmitted. The transmission of the credential(s) in block 208e may be used for purposes of validating/authenticating that the entity transmitting the credential(s) is authorized to access content generally, or a particular content item specifically.

In block 212e, content (e.g., a content item) may be received. For example, the content/content item may be received in response to the credential(s) of block 208e being authenticated. The content received in block 212e may be encrypted.

In block 216e, one or more decryption keys may be received. The decryption key(s) may have associated therewith location and/or timeout constraints/conditions imposed therewith as described above.

In block 220e, the content/content item received in block 212e may be accessed (e.g., played back) via application of the decryption key(s) of block 216e to the content/content item.

While for purposes of simplicity of explanation, the respective processes are shown and described as a series of blocks in FIGS. 2D-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Still further, while the methods 200d and 200e are shown and described separately for the sake of illustrative convenience, aspects of a first of the methods may be combined with aspects of a second of the methods in some embodiments.

Aspects of the disclosure may be applied in connection with hyper precise positioning (HPP) technology, where real-time and substantially real-time data may be accessible to network entities/elements regarding, e.g., user/user device locations. Aspects of the disclosure may be used to authenticate users/user devices with respect to accessibility to content based on such data (and any updates/modifications to the data as such updates become available). For example, aspects of the disclosure may be used to grant conditional access to content based on a user/user device adhering to predetermined criteria, such as for example location and time-based criteria.

Aspects of the disclosure may be applied in relation to Internet of Things (IoT) devices. For example, aspects of the disclosure may be applied in relation to household appliances, automotive applications (e.g., autonomous vehicles, drones, etc.), robotics, mobile devices, and the like. Still further, aspects of the disclosure may be incorporated as part of machine learning and/or artificial intelligence in order to enhance security associated with content while at the same time preserving and respecting user/device privacy.

Aspects of the disclosure may leverage broadcast technology in terms of a transmission of content in order to reduce (e.g., minimize) the overhead (in terms of, e.g., complexity and resources) that is applied to the payload associated with the content. In some embodiments, keys (e.g., decryption keys) are controlled/regulated in terms of geography and/or time to ensure that only authorized users/user devices may access content.

In terms of key distribution, a server may push keys to users/user devices and/or users/user devices may periodically request keys. The server may authenticate the user/user device. The server may ensure any payment that is required is received and validate a user/user device registration.

As described above, keys may expire following a timeout. The time period associated with that timeout may be selected to be long enough to amortize the cost of all user devices being authenticated and allow devices to pre-emptively fetch keys and distribute network load. Portions of encrypted content/content items may be decrypted using one or more keys to generate corresponding decrypted content/content items.

As described above, aspects of the disclosure may be implemented using one or more road side units (RSUs). In some embodiments, the RSUs may be operative in accordance with one or more technologies. In some embodiments, an RSU may be operative in one or more frequency bands. For example, an RSU may use the 5.9 GHz intelligent transportation systems (ITS) band in some embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the system 200a, the system 200b, the system 200c, the method 200d, and the method 200e presented in FIG. 1 and FIGS. 2A-2E. For example, virtualized communication network 300 can facilitate in whole or in part authenticating a user device based on communication over a data plane of a network, responsive to the authenticating, determining a location of the user device, responsive to the authenticating, generating a decryption key that is based on the determined location of the user device, transmitting the decryption key to the user device, and transmitting encrypted content to the user device, wherein the encrypted content is accessible at the user device via the decryption key. Virtualized communication network 300 can facilitate in whole or in part authenticating a user device based on communication over a data plane of a network, responsive to the authenticating, generating a decryption key, transmitting the decryption key to the user device, and transmitting encrypted content to the user device, wherein the encrypted content is accessible at the user device via the decryption key for a predetermined period of time following the transmitting of the decryption key. Virtualized communication network 300 can facilitate in whole or in part transmitting a request for a content item over a data plane of a network, wherein the request includes a first instance of a first credential associated with a network operator and an identifier associated with the content item, receiving encrypted content responsive to the transmitting of the request, receiving a first decryption key, decrypting a first portion of the encrypted content using the first decryption key to generate first decrypted content, and causing the first decrypted content to be presented.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
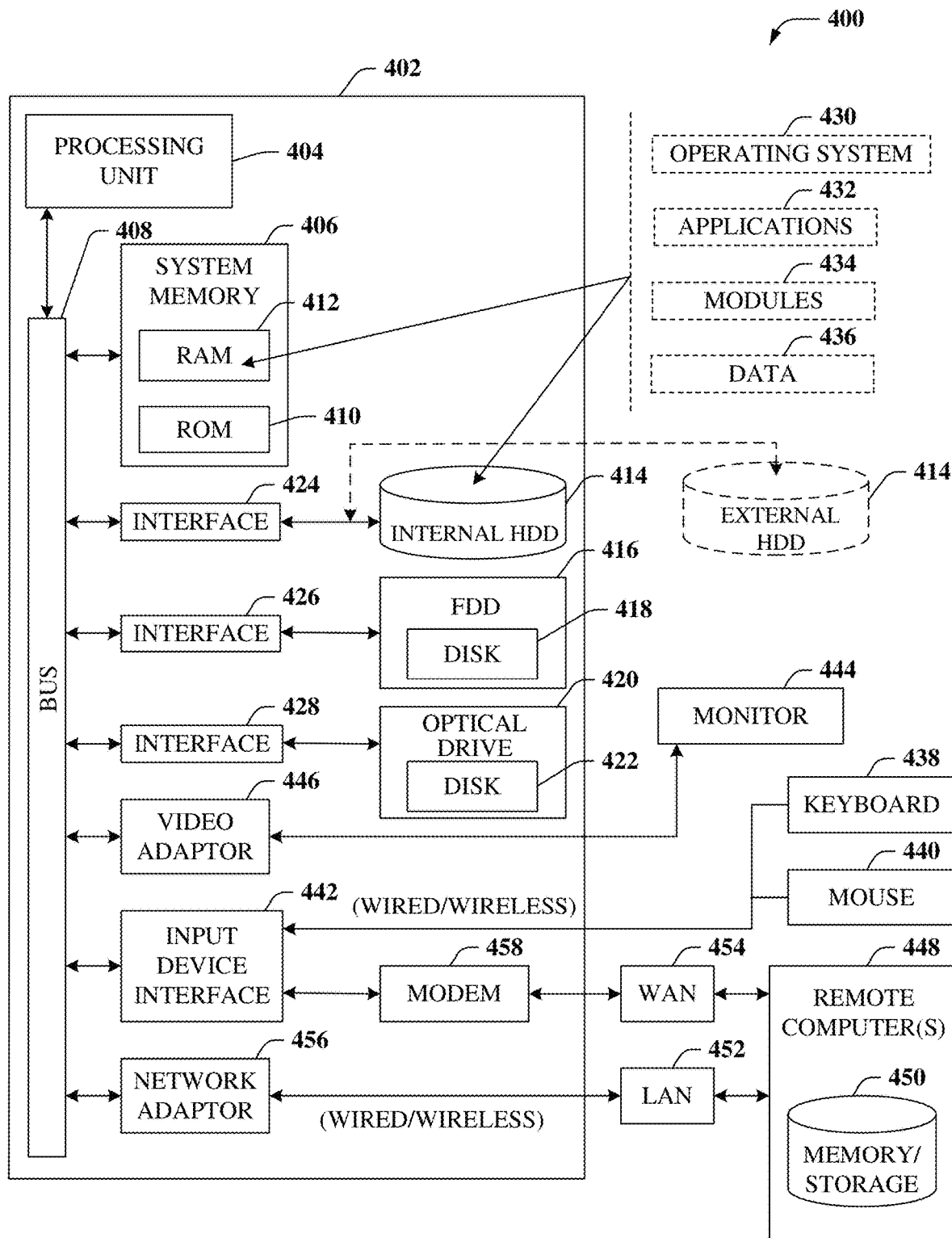
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part authenticating a user device based on communication over a data plane of a network, responsive to the authenticating, determining a location of the user device, responsive to the authenticating, generating a decryption key that is based on the determined location of the user device, transmitting the decryption key to the user device, and transmitting encrypted content to the user device, wherein the encrypted content is accessible at the user device via the decryption key. Computing environment 400 can facilitate in whole or in part authenticating a user device based on communication over a data plane of a network, responsive to the authenticating, generating a decryption key, transmitting the decryption key to the user device, and transmitting encrypted content to the user device, wherein the encrypted content is accessible at the user device via the decryption key for a predetermined period of time following the transmitting of the decryption key. Computing environment 400 can facilitate in whole or in part transmitting a request for a content item over a data plane of a network, wherein the request includes a first instance of a first credential associated with a network operator and an identifier associated with the content item, receiving encrypted content responsive to the transmitting of the request, receiving a first decryption key, decrypting a first portion of the encrypted content using the first decryption key to generate first decrypted content, and causing the first decrypted content to be presented.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
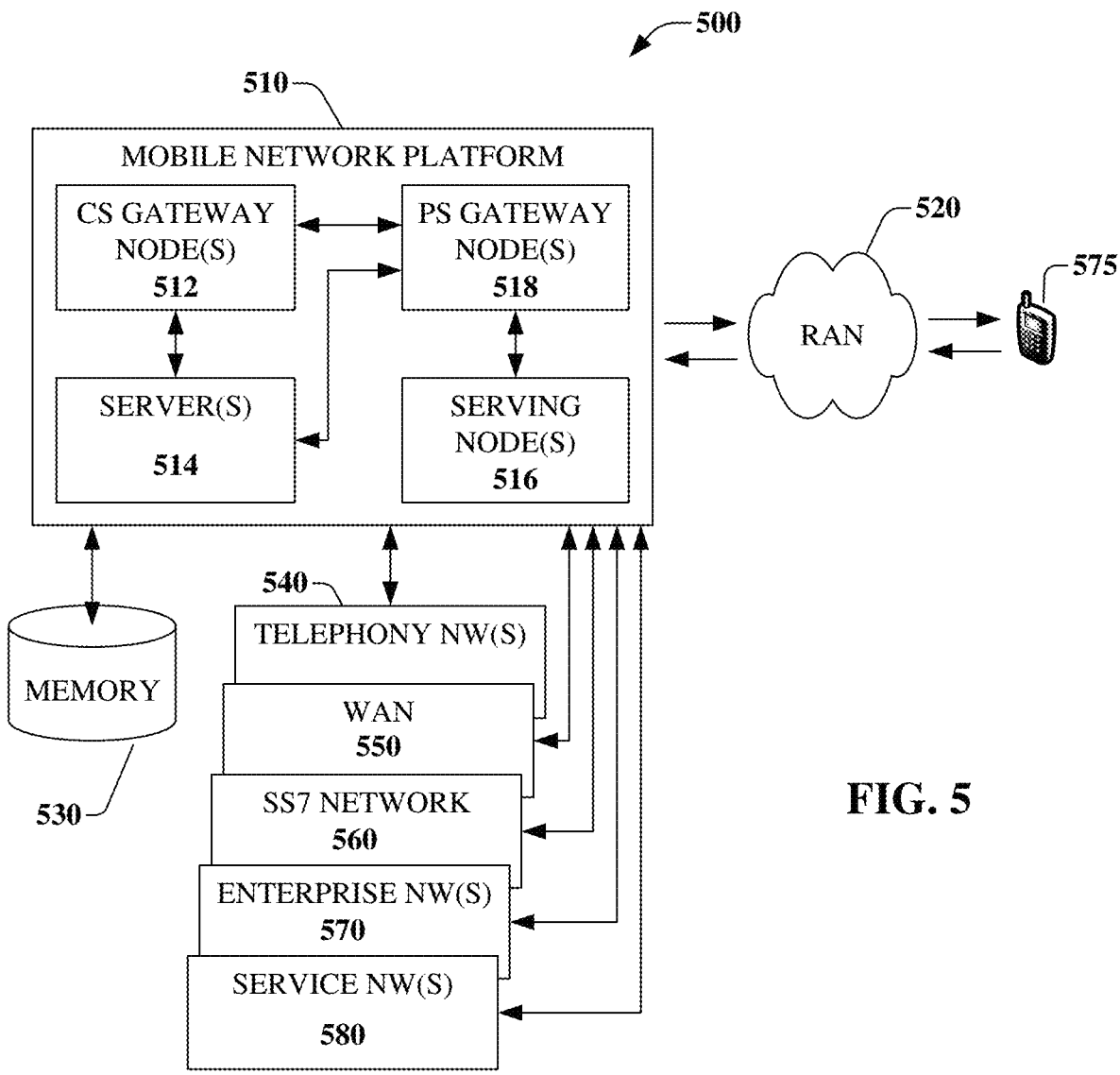
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part authenticating a user device based on communication over a data plane of a network, responsive to the authenticating, determining a location of the user device, responsive to the authenticating, generating a decryption key that is based on the determined location of the user device, transmitting the decryption key to the user device, and transmitting encrypted content to the user device, wherein the encrypted content is accessible at the user device via the decryption key. Platform 510 can facilitate in whole or in part authenticating a user device based on communication over a data plane of a network, responsive to the authenticating, generating a decryption key, transmitting the decryption key to the user device, and transmitting encrypted content to the user device, wherein the encrypted content is accessible at the user device via the decryption key for a predetermined period of time following the transmitting of the decryption key. Platform 510 can facilitate in whole or in part transmitting a request for a content item over a data plane of a network, wherein the request includes a first instance of a first credential associated with a network operator and an identifier associated with the content item, receiving encrypted content responsive to the transmitting of the request, receiving a first decryption key, decrypting a first portion of the encrypted content using the first decryption key to generate first decrypted content, and causing the first decrypted content to be presented.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s)

518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
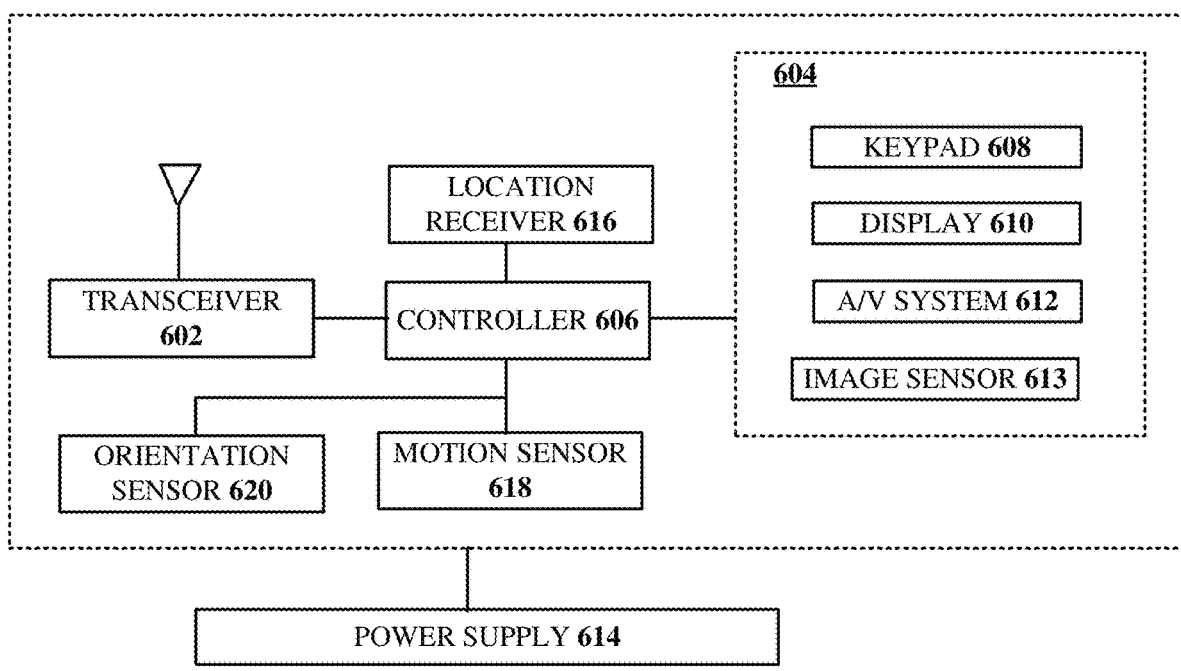
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part authenticating a user device based on communication over a data plane of a network, responsive to the authenticating, determining a location of the user device, responsive to the authenticating, generating a decryption key that is based on the determined location of the user device, transmitting the decryption key to the user device, and transmitting encrypted content to the user device, wherein the encrypted content is accessible at the user device via the decryption key. Computing device 600 can facilitate in whole or in part authenticating a user device based on communication over a data plane of a network, responsive to the authenticating, generating a decryption key, transmitting the decryption key to the user device, and transmitting encrypted content to the user device, wherein the encrypted content is accessible at the user device via the decryption key for a predetermined period of time following the transmitting of the decryption key. Computing device 600 can facilitate in whole or in part transmitting a request for a content item over a data plane of a network, wherein the request includes a first instance of a first credential associated with a network operator and an identifier associated with the content item, receiving encrypted content responsive to the transmitting of the request, receiving a first decryption key, decrypting a first portion of the encrypted content using the first decryption key to generate first decrypted content, and causing the first decrypted content to be presented.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, ..., xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a processing system including a processor; and
 a memory that stores executable instructions that, when executed by the processing system, facilitate performance of operations, the operations comprising:
 authenticating a communication device based on communication over a first plane of a network, wherein the authenticating comprises:
 performing a first comparison of a first instance of a first credential received from the communication device as part of the communication over the first plane of the network with a second instance of the first credential received from a network operator of the network, wherein the communication device receives the first credential from the network operator, and wherein the first credential is not associated with any content provider;
 determining that a match exists between the first instance of the first credential and the second instance of the first credential based on the first comparison;

performing a second comparison of a first instance of a second credential received from the network operator of the network with a second instance of the second credential received from a content provider; and determining that a match exists between the first instance of the second credential and the second instance of the second credential based on the second comparison;

responsive to the authenticating, determining a location of the communication device resulting in a determined location;

responsive to the authenticating, generating a first decryption key that is based on the determined location of the communication device;

transmitting the first decryption key to the communication device;

transmitting encrypted content associated with the content provider to the communication device over a second plane of the network, wherein a first portion of the encrypted content is accessible at the communication device via the first decryption key, and wherein the first decryption key is based on a constraint that limits accessibility to the first portion of the encrypted content via the first decryption key to a distance that is within a threshold of the determined location of the communication device;

receiving a request for a second decryption key from the communication device following an expiration of a timeout measured relative to when the first decryption key is transmitted; and based on the receiving of the request for the second decryption key, transmitting the second decryption key to the communication device.

2. The device of claim 1, wherein the first plane of the network is a data plane of the network.

3. The device of claim 1, wherein the second plane of the network is a control plane of the network.

4. The device of claim 1, wherein the transmitting of the encrypted content is in accordance with broadcast technology.

5. The device of claim 1, wherein the distance is expressed as a function of time.

6. The device of claim 1, wherein the authenticating of the communication device comprises matching a subscriber identification associated with the communication device to a registered address of the communication device.

7. The device of claim 1, wherein the transmitting of the first decryption key occurs at a first time, and wherein the first decryption key expires at a second time that is subsequent to the first time.

8. The device of claim 1, wherein the encrypted content includes media.

9. The device of claim 1, wherein the operations further comprise:
receiving a request for the encrypted content from an electronic programming guide or an interactive programming guide of the communication device,
wherein the authenticating occurs responsive to receiving the request for the encrypted content.

10. A non-transitory machine-readable medium, comprising executable instructions that, when executed by a processing system including a processor, facilitate performance of operations, the operations comprising:
authenticating a user device based on communication over a first plane of a network, wherein the authenticating comprises:
performing a first comparison of a first instance of a first credential received from the user device as part of the communication over the first plane of the network with a second instance of the first credential received from a network operator of the network, wherein the user device receives the first credential from the network operator, and wherein the first credential is not associated with any content provider;

determining that a match exists between the first instance of the first credential and the second instance of the first credential based on the first comparison;

performing a second comparison of a first instance of a second credential received from the network operator of the network with a second instance of the second credential received from a content provider; and determining that a match exists between the first instance of the second credential and the second instance of the second credential based on the second comparison;

responsive to the authenticating, determining a location of the user device resulting in a determined location;

responsive to the authenticating, generating a first decryption key that is based on the determined location of the user device;

transmitting the first decryption key to the user device;

transmitting encrypted content to the user device over a second plane of the network, wherein a first portion of the encrypted content is accessible at the user device via the first decryption key, and wherein the first decryption key is based on a constraint that limits accessibility to the first portion of the encrypted content via the first decryption key to a distance that is within a threshold of the determined location;

receiving a request for a second decryption key from the user device following an expiration of a timeout measured relative to when the first decryption key is transmitted; and based on the receiving of the request for the second decryption key, transmitting the second decryption key to the user device.

11. The non-transitory machine-readable medium of claim 10, wherein the authenticating of the user device comprises matching a subscriber identification associated with the user device to a registered internet protocol (IP) address of the user device.

12. The non-transitory machine-readable medium of claim 11, wherein the operations further comprise:
receiving a request for the encrypted content from the user device.

13. The non-transitory machine-readable medium of claim 12, wherein the operations further comprise:
providing the user device with a set of search results responsive to a search query,
wherein the receiving of the request for the encrypted content from the user device comprises an identification of a search result included in the set of search results,
wherein the user device is a mobile device, and
wherein the determining of the location of the user device is based on a second location of a network element that is in communication with the user device.

14. A method, comprising:
authenticating, by a first device, a communication device based on communication over a first plane of a network, wherein the authenticating comprises:
performing, by the first device, a first comparison of a first instance of a first credential received from the communication device as part of the communication over the first plane of the network with a second instance of the first credential received from a network operator of the network, wherein the communication device receives the first credential from the network operator, and wherein the first credential is not associated with any content provider;

determining, by the first device, that a match exists between the first instance of the first credential and the second instance of the first credential based on the first comparison;

performing, by the first device, a second comparison of a first instance of a second credential received from the network operator of the network with a second instance of the second credential received from a content provider; and determining, by the first device, that a match exists between the first instance of the second credential and the second instance of the second credential based on the second comparison;

responsive to the authenticating, determining, by the first device, a location of the communication device resulting in a determined location;

responsive to the authenticating, generating, by the first device, a first decryption key that is based on the determined location of the communication device;

transmitting, by the first device, the first decryption key to the communication device;

transmitting, by the first device, encrypted content associated with the content provider to the communication device over a second plane of the network, wherein a first portion of the encrypted content is accessible at the communication device via the first decryption key, and wherein the first decryption key is based on a constraint that limits accessibility to the first portion of the encrypted content via the first decryption key to a distance that is within a threshold of the determined location of the communication device;

receiving, by the first device, a request for a second decryption key from the communication device following an expiration of a timeout measured relative to when the first decryption key is transmitted; and based on the receiving of the request for the second decryption key, transmitting, by the first device, the second decryption key to the communication device.

15. The method of claim 14, further comprising:

decrypting, by a processing system of the communication device, a second portion of the encrypted content using the second decryption key to generate second decrypted content; and causing, by the processing system, the second decrypted content to be presented.

16. The method of claim 14, wherein the first plane of the network is a data plane.

17. The method of claim 14, wherein the second plane of the network is a control plane.

18. The method of claim 14, wherein a processing system of the communication device is included as part of a household appliance, an automotive application, or a robot.

* * * * *